United States Patent
Tene et al.

(10) Patent No.: US 8,838,940 B2
(45) Date of Patent: Sep. 16, 2014

(54) CPU UTILIZATION METERING ON SYSTEMS THAT INCLUDE MULTIPLE HARDWARE THREADS PER CORE

(75) Inventors: Gil Tene, Los Altos Hills, CA (US); Michael A. Wolf, San Francisco, CA (US); Cliff N. Click, Jr., San Jose, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 1186 days.

(21) Appl. No.: 11/449,154

(22) Filed: Jun. 7, 2006

(65) Prior Publication Data

US 2007/0288728 A1    Dec. 13, 2007

(51) Int. Cl.
- *G06F 15/00* (2006.01)
- *G06F 9/30* (2006.01)
- *G06F 9/44* (2006.01)
- *G06F 11/34* (2006.01)

(52) U.S. Cl.
CPC ........ *G06F 11/3423* (2013.01); *G06F 2201/88* (2013.01)
USPC .......................................................... 712/220

(58) Field of Classification Search
USPC ........................................................ 712/220
See application file for complete search history.

(56) References Cited

U.S. PATENT DOCUMENTS

| | | | |
|---|---|---|---|
| 5,920,689 A | * | 7/1999 | Berry et al. ..................... 714/47 |
| 2002/0007387 A1 | * | 1/2002 | Ginsberg ....................... 709/102 |

OTHER PUBLICATIONS

Fedorova et al.; Chip Multithreading Systems Need a New Operating System Scheduler; Sep. 2004; 11th Workshop on ACM SIGOPS; pp. 1-6.*

Xu et al.; Performance Study and Dynamic Optimization Design for Thread Pool Systems; International Conference on Computing, Communications and Control Technologies (CCCT'04), 2004.*

Kihm et al.; Understanding the Impact of Inter-Thread Cache Interference on ILP in Modern SMT Processors; Jun. 2005; Journal of Instruction-Level Parallelism 7 (2005) 1-28.*

* cited by examiner

*Primary Examiner* — Corey S Faherty
(74) *Attorney, Agent, or Firm* — Van Pelt, Yi & James LLP

(57) ABSTRACT

Indicating usage in a system is disclosed. Indicating includes obtaining active thread information related to a number of hardware threads in a processor core, combining the active thread information with information related to a decreasing ability of the processor core to increase throughput by utilizing additional hardware threads, and indicating the usage in the system based at least in part on both the active thread information and the ability of the processor core to increase throughput by utilizing additional hardware threads.

27 Claims, 5 Drawing Sheets

CPU UTILIZATION METERING ON SYSTEMS THAT INCLUDE MULTIPLE HARDWARE THREADS PER CORE

BACKGROUND OF THE INVENTION

Multithreaded cores have recently become available from multiple vendors, and ship in many servers (e.g., Xeon hyper-threaded cores from Intel, Power 5 from IBM, Niagara from Sun). Multithreaded cores execute multiple hardware threads concurrently (or in a tightly interleaved fashion) on a single processor core. When used by common operating systems (e.g., Linux, Windows, AIX, Solaris), each hardware thread is typically represented by the operating system (OS) as a CPU (or processor, or hardware thread): a hardware entity that can execute a software thread. The OS is responsible for scheduling software threads for execution by cores and their hardware threads. The OS also monitors and reports on the utilization of hardware thread resources. A commonly used indication of utilization is CPU % or idle %, which is often measured and displayed independently for each hardware thread, each core, or aggregated for the entire system. For example, commands such as vmstat, mpstat, top, etc. and performance monitoring tools such as top, windows performance monitor, etc. may be used to view an indication of utilization. Current operating systems (e.g., Linux, Windows, AIX, Solaris) report utilization of hardware threads as CPUs. For monitoring purposes, these OSs treat hardware threads that share a common core in the same way that they have treated single-threaded processor cores.

While the use of multiple hardware threads tends to allow cores that support them higher total throughput per core than they would when running a single hardware thread per core, virtually all multi-threaded cores can show significant performance interference between threads sharing the same core. This interference can result in significant inaccuracies in the correlation between CPU utilization or idle % and system throughput. For some applications, such as applications that perform many dependent memory accesses and take many cache misses, hardware threads may interleave almost perfectly on a core, while for other applications, such as tight loop register-only computations, or bandwidth-saturating streaming, a single hardware thread can consume a significant portion of a core's execution resources, leaving little additional throughput to be gained by additional hardware threads sharing the core. This inconsistency introduces a new problem for system capacity and utilization monitoring, where one of the main indicators used by system administrators and monitoring systems to track system utilization and available headroom can now generate strongly flawed indications.

Thus, it would be desirable to measure and report system and core utilization in a way that correlates more closely with achieved or achievable throughput.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
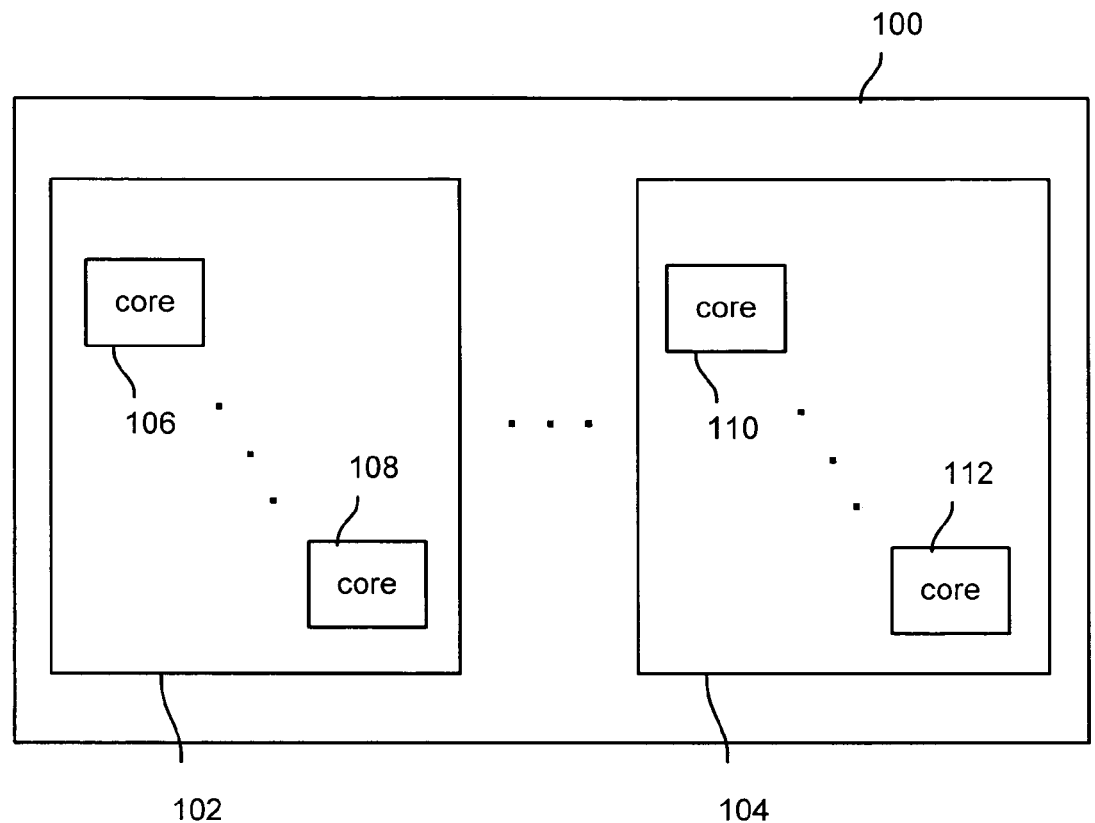
FIG. 1 is a block diagram illustrating an embodiment of a system having multithreaded cores.
Figure 1:
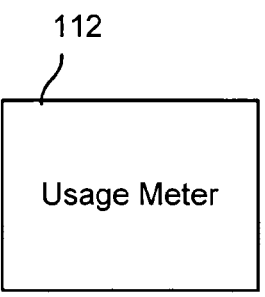

FIG. 1 is a block diagram illustrating an embodiment of a system having multithreaded cores. In the example shown, system 100 is shown to include chips 102-104, which each include multiple cores. For example, chip 102 includes cores 106-108 and chip 104 includes cores 110-112. Each core may include multiple hardware threads. Usage meter 114 may indicate utilization of each hardware thread or of each core or of the whole system or of a portion of the system. For example, usage meter 114 may be displayed in a user interface to a system administrator.

As used herein, "hardware thread" and "thread slot" may be used interchangeably. The OS schedules software threads for execution on hardware threads. In some embodiments, the OS controls which hardware thread(s) execute which software thread(s) and for how long, and core(s) control which instruction(s) are run on which hardware thread(s) and when.

CPU utilization % indications are measured by operating systems in various ways. One way is to measure the amount of "idle" time a system, core, or hardware thread has, and report either the idle %, or the CPU utilization % (100%−idle %). Collecting the measurement of the amount or % of idle time can be done in various ways. These measurement methods can be used to establish the amount of time, or the % of time over some measurement interval, during which a hardware thread could have been used to execute a software thread, but was not used to do so by the operating system. This % measurement can then be reported directly, or dampened in some form (a linear or non-linear dampening function or filter), with the dampened indication being reported as idle %.

One method used to measure idle % is to track the elapsed time spent by each "CPU" (hardware thread or core) in an "idle loop", which the operating system executes when no software thread is scheduled for execution on the hardware thread. The amount (or %) of time that this elapsed idle represents out of a measurement interval is then computed as the idle time (or %). Another method used to save power or avoid taking up core resources in the execution of an idle loop is to "idle" the hardware thread when no software thread is scheduled for execution on it, and to account for the amount of elapsed time that the hardware thread was so "idled" in computing idle time and idle %. "Idling" a hardware thread can be done in many different ways, and often depends on the hardware's architecture and capabilities. Some cores may recognize a specific idle loop pattern, and minimize the spending power or thread execution resources when executing that pattern. Some cores support specific instructions, configuration and/or control registers, or some other control means that place a hardware thread (or an entire core) in an "idle" mode that minimizes the consumption of power, and the consumption of execution resources that could otherwise be used by other hardware threads. Many other methods of measuring idle time and idle % of an individual hardware thread may be used, and may be used by operating systems to track and report idle time and idle % on hardware threads, cores, and the system as a whole.

When idle time or idle % is measured independently on multiple hardware threads that share execution resources, a false indication of idle resources and available headroom can result. While this situation is true of independent measurements in the presence for any shared resource (including system memory bandwidth, shared bus bandwidth, shared cache space, shared cache bandwidth, etc.), it can be especially disruptive when the shared resources are tightly interleaved between hardware threads, such as the case of shared execution units, pipelines, ALUs, floating point units, etc.

The resulting false idle indications, can lead the CPU % indication (which has historically been used by system administrators to determine available headroom and potential total system throughput) to be potentially inaccurate, potentially erratic, and potentially very application dependent. Specifically, systems based on 4-threaded cores can be demonstrated to peak in throughput (with simple tight loop series computations) while showing 30-40% CPU indications, where the system produces little or no additional throughput as CPU % indications grow from 30%-40% to 100%. This existing behavior (seen in operating systems such as Linux and Solaris) can lead to significant challenges in deploying and managing systems based on multi-threaded cores. A system administrator must either face significant uncertainty about what a system's "fullness" is, or they must overprovision the system to compensate for the potential inaccuracy and erratic readings (which could lead to 3× over-provisioning needs on top of current provisioning methods).

Thus, it would be desirable to create a more accurate means of tracking CPU utilization % on multi-threaded core based systems, such that CPU utilization % more closely tracks achieved system throughput on common workloads. This is especially true for workloads that have historically shown near-linear (or directly proportional) throughput-to-CPU % relationships on normal (non multithreaded core based) servers, and have established a significant expectation of CPU % representing available compute headroom.

Figure 2:
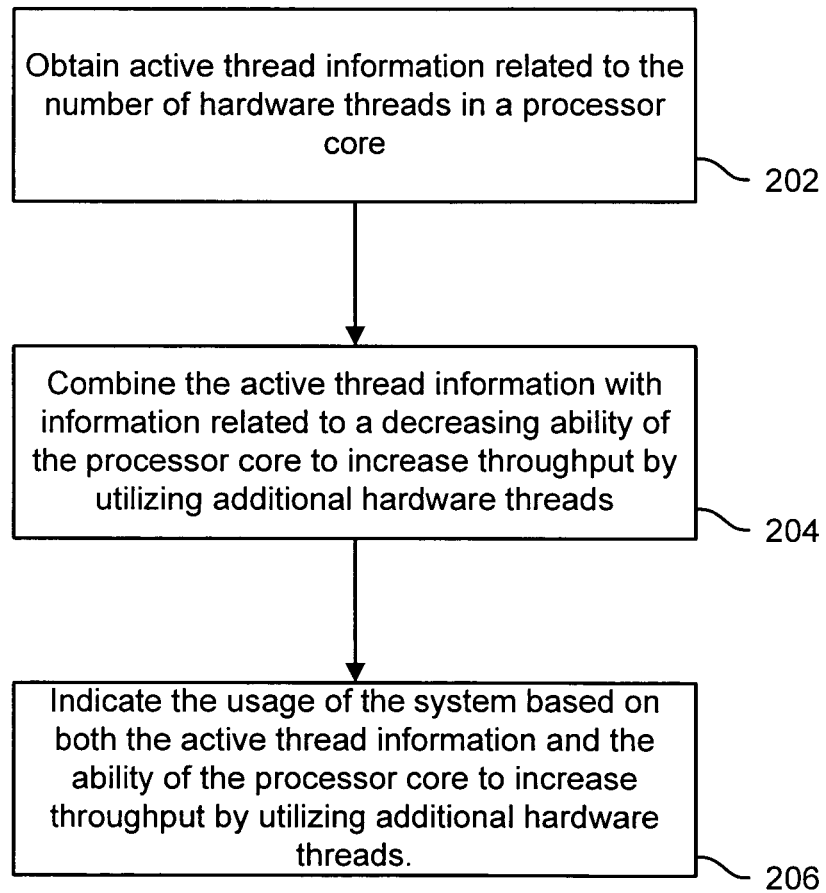
FIG. 2 is a flow chart illustrating an embodiment of a process for indicating usage in a system.

FIG. 2 is a flow chart illustrating an embodiment of a process for indicating usage in a system. At 202, active thread information related to the number of hardware threads in a processor core is obtained. For example, a % idle may be determined by determining the average number of active hardware threads over an interval of time. As used herein, "active" refers to non-idle. A thread is idle when it is idling or could be idling (e.g., running an idle loop).

At 204, the active thread information is combined with information related to a decreasing ability of the processor core to increase throughput by utilizing (e.g., executing) additional threads. In some embodiments, the core has a decreasing ability to increase throughput by executing additional threads, as opposed to throughput being directly proportional to the number of threads executing on the core. In other words, adding a second thread does not necessarily double the throughput.

Cycles per instruction (CPI) is an example of information related to a decreasing ability of a core to increase throughput by executing additional threads. In some cases, the lower the CPI, the lower the ability of a core to increase throughput by executing additional threads.

At 206, the usage in the system, based on both the active thread information and the ability of the processor core to increase throughput by utilizing additional hardware threads, is indicated. For example, a % idle and CPI measurement may be used to determine a usage in the system. The usage may be indicated in a user interface, e.g., using a usage meter. Further examples are described below.

Figure 3:
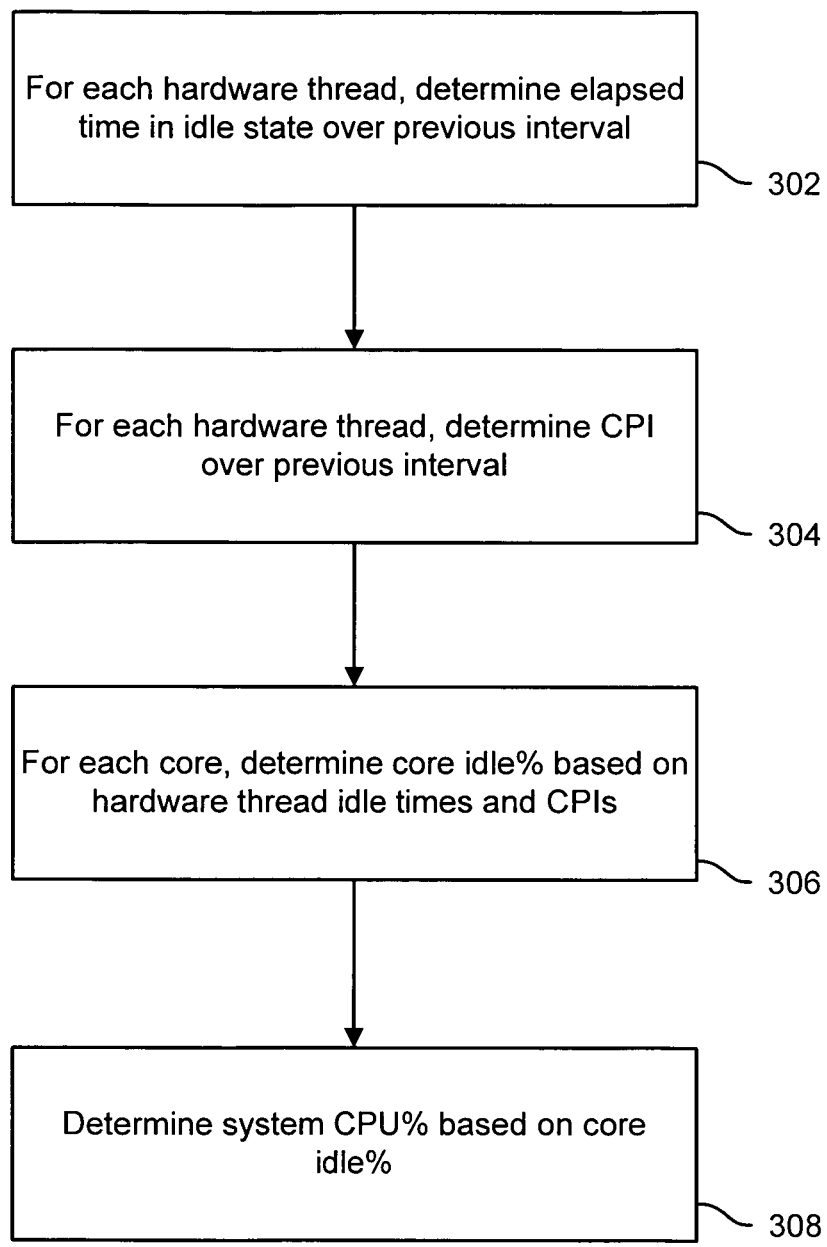
FIG. 3 is a flow chart illustrating an embodiment of a process for indicating usage in a system based on active thread information and the ability of the core to increase throughput by utilizing additional threads.

FIG. 3 is a flow chart illustrating an embodiment of a process for indicating usage in a system based on active thread information and the ability of the core to increase throughput by utilizing additional threads. At 302, for each hardware thread, an elapsed time in an idle state over a previous interval is determined. In other words, for each hardware thread, the % idle time over an interval is determined. At 304, for each hardware thread, a CPI over the previous interval is determined. In some embodiments, a performance counter is used to determine CPI. At 306, for each core, a core idle % based on hardware thread idle times and CPIs is determined. For example, for each core, core idle % may be determined as follows:

$$\text{core\_idle \%} = 100 \times \min\left\{ \sum_{i=1}^{n} \frac{HWT_i\_\text{idle\_time}}{n \times \text{interval}}, 1 - (\text{core\_typ\_CPI})\left(\sum_{i=1}^{n} \frac{1}{HWT_i\_\text{CPI}}\right) \right\}$$

where:

n is the number of hardware threads $HWT_i\_\text{idle\_time}$ is the idle time for the ith hardware thread $HWT_i\_\text{CPI}$ is the CPI for the ith hardware thread core_typ_CPI is the typical CPI on the core at full throughput For example, if the core can execute one cycle per instruction, its core_typ_CPI is 1. If the core can execute up to two cycles per instruction, its core_typ_CPI is 2.

Thus, the core idle % depends on both the idle time and CPI of each hardware thread.

At 308, a system CPU % is determined based on the core idle %. For example, the system CPU % may be determined as follows:

$$\text{system\_CPU }\% = 100 - \frac{\sum \text{core\_idle }\%}{\text{num\_cores}}$$

The above equations are some examples of ways in which usage in a system can be determined or approximated based on the number of active threads and the ability of the core to increase throughput by utilizing additional threads. In other embodiments, other equations may be used.

In some embodiments, at the end of each interval, the above computations are performed. In other embodiments, each time a software thread starts executing on or stops executing on a hardware thread, the above computations are performed.

Alternatively, instead of a system CPU %, a core CPU % may be determined at 308 as follows:

core_CPU %=100−core_idle %

A core CPU % may be determined for any number of cores.

Figure 4:
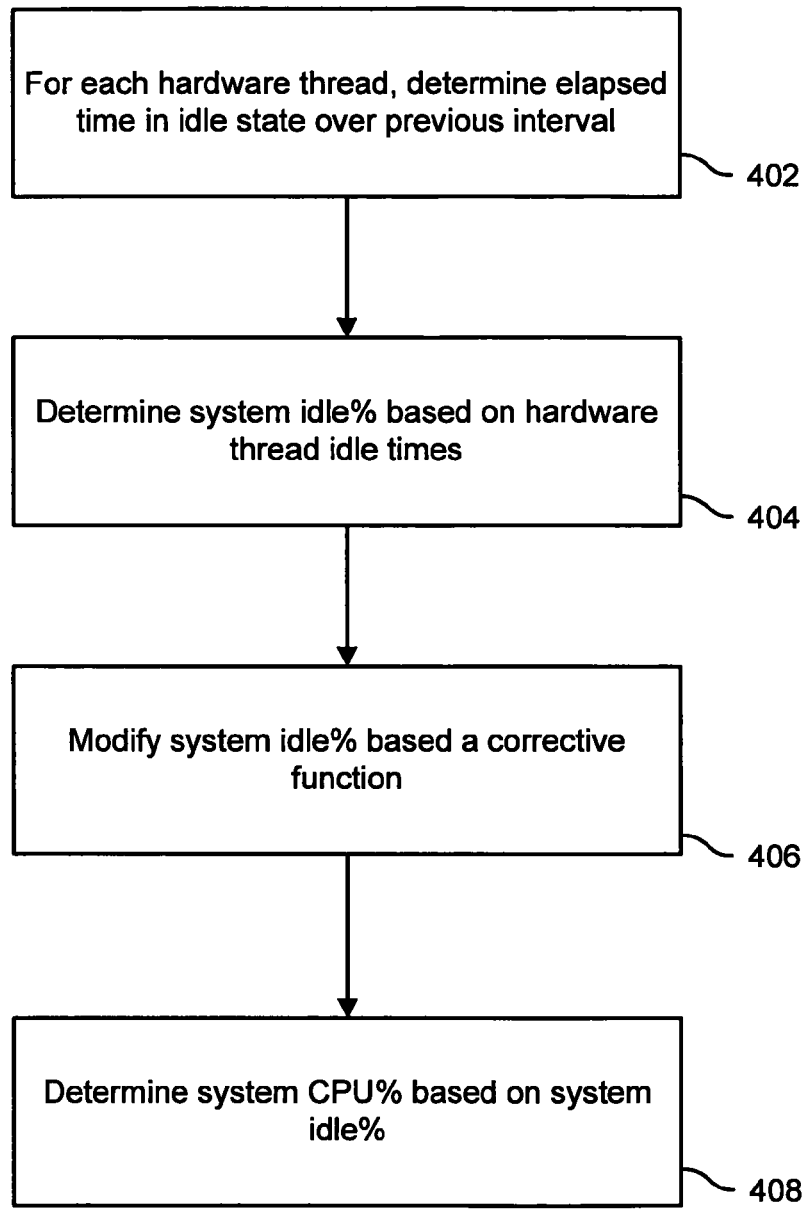
FIG. 4 is a flow chart illustrating an embodiment of a process for indicating usage in a system based on active thread information and the ability of the core to increase throughput by utilizing additional threads.

FIG. 4 is a flow chart illustrating an embodiment of a process for indicating usage in a system based on active thread information and the ability of the core to increase throughput by utilizing additional threads. In this example, a corrective function is used to determine system usage.

At 402, for each hardware thread, an elapsed time in an idle state over a previous interval is determined. At 404, a system idle % is determined based on hardware thread idle times. For example:

$$\text{system\_idle }\% = 100 \times \frac{\sum_{i=1}^{N} HWT_i\_\text{idle\_time}}{N \times \text{interval}}$$

where N is the number of hardware threads

At 406, the system idle % is modified based on a corrective function. The corrective function may be any appropriate function used to improve the accuracy of system idle % determined at 404. In some embodiments, the corrective function is heuristically determined. For example, based on measurements of number of executing threads versus throughput, a corrective function may be determined. Alternatively, the system could be probed. For example, an integer loop and/or other workload(s) could be run periodically and sampled. Based on the result, a corrective function may be determined. The corrective function may be different depending on the workload. Examples of workloads include memory accesses, floating point operations, etc. The corrective function may be implemented using a lookup table. The corrective function could be static or dynamic. Corrective functions are discussed more fully below.

At 408, a system CPU % is determined based on the system idle %. For example:

system_CPU %=100−system_idle %

Alternatively, instead of a system CPU %, a core CPU % may be determined, in which case a core idle % is determined using the idle times of the hardware threads running on the core at 402 (N=number of hardware threads on the core). A core CPU % may be determined at 408 as follows:

core_CPU %=100−core_idle %

Figure 5:
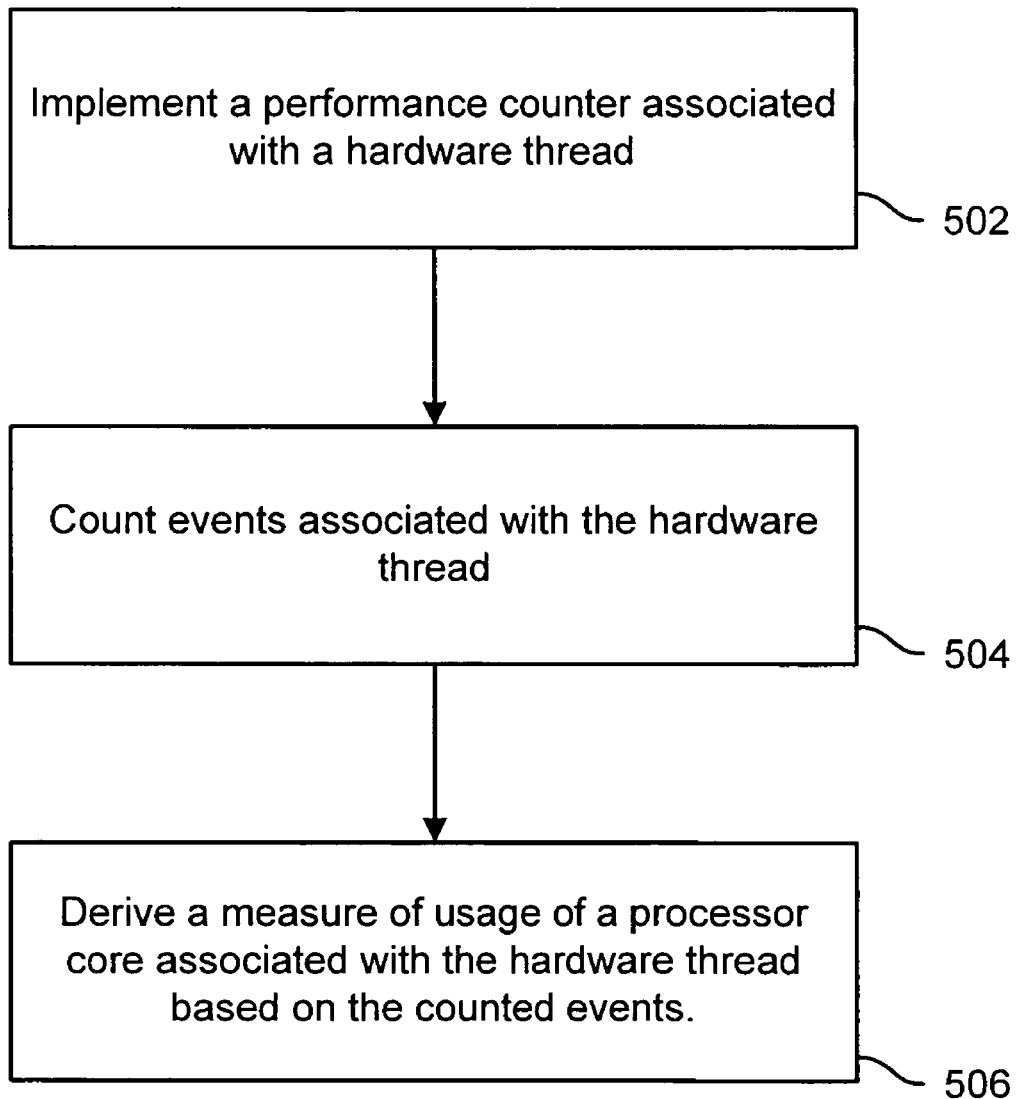
FIG. 5 is a flow chart illustrating an embodiment of a process for indicating processor usage in a system based on a performance counter.

FIG. 5 is a flow chart illustrating an embodiment of a process for indicating processor usage in a system based on a performance counter. At 502, a performance counter associated with a hardware thread is implemented. A performance counter may be implemented for one or more hardware threads, cores, or systems. Any number of performance counters may be implemented.

At 504, events associated with the hardware thread are counted. A performance counter may be configured to count any appropriate event associated with one or more hardware threads, cores, or systems. Events include instructions executed, cache misses, loads, stores, etc. For example, a performance counter may accumulate average CPI, count memory accesses, count cycles and/or count instructions. CPI may be computed using the counted cycles and the counted instructions. There may be a performance counter that indicates utilization or data associated with utilization. For example, the number of idle cycles in a core may be counted.

At 506, a measure of usage of a processor core associated with the hardware thread is derived based on the counted events. For example, based on a performance counter result alone or in combination with other data, a system CPU % or core CPU % may be determined. The usage may then be indicated in a user interface, e.g., using a usage meter.

As described herein, a corrective function may be used in the reporting of idle CPU % for each core in a system. A corrective function can take many forms. Any corrective function applied to classic methods of measuring idle CPU % to more closely represent available system throughput may be used.

In addition, alternative means of measuring "idle potential" of a core that use performance counter indications (in addition to or other than elapsed time) in establishing the idle duty cycle of a core or a hardware thread may be used.

The corrective function may, in some embodiments, use profiling information gathered about software threads and processes in the system (such as CPI, miss rates, branch rates, etc.) to establish some corrective model of the potential utilization and available headroom of a core when running software threads that meet the measured profiles.

Examples of corrective functions include:

1. A non-linear static translation of idle time, applied independently to the idle time of each hardware thread in the core.

2. Accounting for total core utilization by accounting for utilized cycles on the core (using some form of performance counter).

3. Accounting for total core utilization by accounting for utilized memory and prefetch bandwidth of the core (using some form of performance counter).

4. Accounting for total core utilization by accounting for total number of cache misses performed by the core (using some form of performance counter).

5. Establishing software thread behavior metrics by periodically (or statically) profiling software threads individually (or across multiple threads in a process, or across all threads in a system, or by sampling some of the threads and extrapolating the sample to other thread), and using such behavior metrics to establish an estimated CPU utilization corrective function.

a. The corrective function could be applied identically to all cores in a system, to each core separately, or to each hardware thread on each core in the system, using common profiling metrics across all threads in a system.

b. The corrective function could be separately applied to each core in the system, using information about the software threads currently scheduled for execution on the core, and attempting to estimate the amount of "available extra throughput" the core has in not-currently-scheduled hardware thread slots.

c. The corrective function could be applied to each hardware thread in a core separately, using information about the software threads currently scheduled on other hardware thread slots in the same core.

6. Limiting thread scheduling such that only threads of a common process can concurrently share a core, and using process-specific profiling information to establish the core utilization more accurately.

In the following example, idle core time is calculated by profiling CPI under fully loaded core conditions, establishing the potential instructions per second a core can sustain:

Define "loaded core CPI" as the core cycles per executed instruction that a core experiences when simultaneously running a software thread on each hardware thread on the core.

Collect average "core CPI" across all cores in the system during a period of time (or sample some cores, when they are "full" of threads, or artificially schedule multiple threads to a single core for a short period of time to establish the "recent" loaded core CPI even when the system utilization is low).

Calculate "Core Instructions Per Second Potential" (CIPSP) as Core_Frequency/Loaded_Core_CPI Track executed instructions per second on each core.

Calculate idle time for a core as idle %=executed instructions/CIPSP.

In the following example, each software thread's "single threaded" CPI is continuously or periodically instrumented (i.e., data is collected), and this information is used to estimate the amount of "empty resources" that exist on a core when that thread uses it, resulting in a more accurate modeling of CPU idle % on each core:

Instrument "single threaded" CPI of each individual software thread. This can be done in various ways, for example, each thread can periodically be scheduled for a short amount of time on a dedicated core (with no other software threads scheduled at the same time on the same core), and the core's CPI can be measured to establish the thread's single-threaded CPI. Alternatively, a per-hardware-thread performance counter can be constructed that would establish or approximate a thread's single-threaded CPI by discounting core cycles that were not made available to the specific hardware thread when the hardware thread could have actually made use of them (in effect, cycles where the thread was "hardware executable and not blocked", but did not receive core cycles).

Using the CPI information established for each software thread, model the amount or % of "empty cycles" in a core by accounting for the expected cycle consumption of each hardware thread currently executing on the core. Use modeled empty cycles as "idle %" for the core.

For example, assume core modeling shows that the core can execute 1 instruction per cycle with an ideally fed pipeline, and that the core can execute 4 or more hardware threads. The core has 3 threads currently executing, with single threaded CPIs of 3, 3, and 6. An approximation model would show that out of every 6 core cycles, 5 are actually utilized by threads, and the core is ⅙th "idle". The resulting Core CPU % on mpstat should be 83%.

In another example, assume core modeling shows that the core can execute 1 instruction per cycle with an ideally fed pipeline. The core has 2 threads currently executing, with single threaded CPIs of 2 and 1.5. An approximation model would show that all core cycles would be tightly consumed by the two threads, and the core is 0% "idle". The resulting Core CPU % on mpstat should be 100%.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of indicating usage in a system, including:
   determining a first value based at least in part on active hardware thread information associated with a measure of activity of a plurality of hardware threads in a processor core over an interval of time, wherein the active hardware thread information includes information about the amount of idle time of at least one of the hardware threads during the interval of time;
   determining a second value based at least in part on information related to a decreasing ability of the processor core to increase throughput when the number of idle hardware threads is reduced;
   determining the usage in the system, including selecting one of the first value and the second value, the usage being indicative of a ratio of a rate at which the system has performed a workload over the interval of time to a rate at which the system would perform the workload if the system were continuously executing the workload over the same interval of time, wherein at least one of the hardware threads is idle for at least a portion of the interval of time.

2. A method as recited in claim 1, wherein the active thread information includes the number of active hardware threads in the system over a period of time.

3. A method as recited in claim 1, wherein obtaining includes determining an amount of time during which a hardware thread is idle over a period of time.

4. A method as recited in claim 1, wherein the active thread information includes a percentage of time during which a hardware thread is idle over a period of time.

5. A method as recited in claim 1, wherein the active thread information includes a fraction of a total number of hardware threads.

6. A method as recited in claim 1, wherein combining includes using a function of the active thread information.

7. A method as recited in claim 1, wherein combining includes using a function of the active thread information, wherein the function is dynamic.

8. A method as recited in claim 1, wherein combining includes using a function of the active thread information, wherein the function result is based at least in part on profiling information of one or more software threads.

9. A method as recited in claim 1, wherein combining includes using a function of the active thread information, wherein the function result is based at least in part on information about one or more software threads.

10. A method as recited in claim 1, wherein combining includes applying a corrective function to more than one processor core in the system.

11. A method as recited in claim 1, wherein combining includes applying a corrective function to more than one hardware thread in the system.

12. A method as recited in claim 1, wherein combining includes using a lookup table to modify the active thread information.

13. A method as recited in claim 1, wherein information related to a decreasing ability of the processor core to increase throughput by utilizing additional threads includes information derived at least in part from a performance counter.

14. A method as recited in claim 1, wherein information related to a decreasing ability of the processor core to increase throughput by utilizing additional threads includes cycles per instruction (CPI) or instructions per cycle (IPC).

15. A method as recited in claim 1, wherein combining includes comparing the active thread information and the information related to a decreasing ability of the processor core to increase throughput by utilizing additional threads.

16. A method as recited in claim 1, wherein combining includes the use of a cycles per instruction (CPI) based calculation and an idle time based calculation.

17. A method as recited in claim 1, wherein combining includes obtaining information derived from a performance counter.

18. A method as recited in claim 1, further including limiting software thread scheduling such that only threads of a common process concurrently share a processor core.

19. A method as recited in claim 1, further including using process specific information to determine the usage.

20. A method as recited in claim 1, further including using process specific dynamic information to determine the usage.

21. A method as recited in claim 1, wherein usage in the system includes usage associated with one or more processor cores.

22. A method as recited in claim 1, wherein the system includes more than one processor core.

23. A method as recited in claim 1, wherein the system includes more than one hardware thread.

24. A system for indicating usage in a system, including:
a processor configured to:
determine a first value based at least in part on active hardware thread information associated with a measure of activity of a plurality of hardware threads in a processor core over an interval of time, wherein the active hardware thread information includes information about the amount of idle time of at least one of the hardware threads during the interval of time;
determine a second value based at least in part on information related to a decreasing ability of the processor core to increase throughput when the number of idle hardware threads is reduced; and
determining the usage in the system, including selecting one of the first value and the second value, the usage being indicative of a ratio of a rate at which the system has performed a workload over the interval of time to a rate at which the system would perform the workload if the system were continuously executing the workload over the same interval of time, wherein at least one of the hardware threads is idle for at least a portion of the interval of time; and
a memory coupled with the processor, wherein the memory provides the processor with instructions.

25. A computer program product for indicating usage in a system, the computer program product being embodied in a computer readable storage medium and comprising computer instructions for:
determining a first value based at least in part on active hardware thread information associated with a measure of activity of a plurality of hardware threads in a processor core over an interval of time, wherein the active hardware thread information includes information about the amount of idle time of at least one of the hardware threads during the interval of time;
determining a second value based at least in part on information related to a decreasing ability of the processor core to increase throughput when the number of idle hardware threads is reduced; and
determining the usage in the system, including selecting one of the first value and the second value, the usage being indicative of a ratio of a rate at which the system has performed a workload over the interval of time to a rate at which the system would perform the workload if the system were continuously executing the workload over the same interval of time, wherein at least one of the hardware threads is idle for at least a portion of the interval of time.

26. A method as recited in claim 1, wherein usage in the system includes aggregate usage of multiple processor cores in the system.

27. A method as recited in claim 1, wherein:
the first value corresponds to $$\sum_{i=1}^{n} \frac{HWT_i\_idle\_time}{n \times interval};$$

the second value corresponds to $$1 - (core\_typ\_CPI)\left(\sum_{i=1}^{n} \frac{1}{HWT_i\_CPI}\right);$$

n corresponds to the number of hardware threads;
$HWT_i\_idle\_time$ corresponds to the idle time for the ith hardware thread;
$HWT_i\_CPI$ corresponds to the CPI for the ith hardware thread; and
core_typ_CPI corresponds to the typical CPI on the core at full throughput.

* * * * *